(12) United States Patent
Roth

(10) Patent No.: US 11,161,587 B2
(45) Date of Patent: Nov. 2, 2021

(54) FLOOR ASSEMBLY COMPRISING A MONOLITHIC FLOOR ELEMENT, AND AIRCRAFT REGION AND AIRCRAFT COMPRISING A FLOOR ASSEMBLY

(71) Applicant: Airbus Operations GmbH, Hamburg (DE)

(72) Inventor: Ingo Roth, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 266 days.

(21) Appl. No.: 16/190,519

(22) Filed: Nov. 14, 2018

(65) Prior Publication Data
US 2019/0144099 A1    May 16, 2019

(30) Foreign Application Priority Data
Nov. 15, 2017    (DE) ..................... 10 2017 220 378.1

(51) Int. Cl.
*B64C 1/18*    (2006.01)
*B64C 1/06*    (2006.01)
*B64D 11/06*    (2006.01)

(52) U.S. Cl.
CPC ............. *B64C 1/18* (2013.01); *B64C 1/061* (2013.01); *B64D 11/0696* (2013.01)

(58) Field of Classification Search
CPC ........ B64C 1/18; B64C 1/061; B64D 11/0696
See application file for complete search history.

(56) References Cited

U.S. PATENT DOCUMENTS

| 4,479,621 | A | 10/1984 | Bergholz |
| 5,234,297 | A | 8/1993 | Wieck et al. |
| 6,086,018 | A | 7/2000 | Gobeil et al. |
| 6,219,983 | B1 | 4/2001 | Jensen et al. |
| 7,775,479 | B2 | 8/2010 | Benthien |

(Continued)

FOREIGN PATENT DOCUMENTS

| DE | 31 41 869 A1 | 5/1983 |
| DE | 4102274 C1 | 1/1992 |

(Continued)

OTHER PUBLICATIONS

German Search Report; priority document.
European Search Report for corresponding European Patent No. 18206208 dated Jul. 12, 2019.

*Primary Examiner* — Brian M O'Hara
*Assistant Examiner* — Keith L Dixon
(74) *Attorney, Agent, or Firm* — Greer, Burns & Crain, Ltd.

(57) ABSTRACT

A floor assembly for an aircraft comprising a multiplicity of supports configured to be fastened in pairs to opposite sides of a frame of the aircraft, and a monolithic self-supporting floor element comprising at least two longitudinal members, a floor plate arranged on the longitudinal members and a respective connecting element arranged at each end of each of the longitudinal members. The floor element can be fastened to the frame by fastening of each connecting element to a corresponding support, and the floor plate can extend in the direction of the longitudinal members at least between two supports fastened in pairs. Furthermore, an aircraft region comprises such a floor assembly, an aircraft comprises such an aircraft region.

15 Claims, 8 Drawing Sheets

(56) References Cited

U.S. PATENT DOCUMENTS

| | | | |
|---|---|---|---|
| 2006/0202084 A1* | 9/2006 | Smallhorn | B64D 11/0015 244/118.5 |
| 2008/0210820 A1 | 9/2008 | Kismarton et al. | |
| 2009/0236472 A1* | 9/2009 | Wood | B64C 1/18 244/119 |
| 2010/0102169 A1 | 4/2010 | Zorzetto et al. | |
| 2010/0243803 A1* | 9/2010 | Westre | B64C 1/18 244/119 |
| 2010/0314494 A1* | 12/2010 | Gasser | B64C 1/20 244/131 |
| 2011/0036946 A1 | 2/2011 | Depeige et al. | |
| 2012/0304579 A1* | 12/2012 | Dezoete | B64C 1/18 52/582.2 |
| 2013/0306794 A1* | 11/2013 | Zahlen | B64C 1/00 244/118.5 |
| 2014/0291447 A1* | 10/2014 | Goehlich | B64C 1/061 244/119 |
| 2015/0048206 A1* | 2/2015 | Deloubes | B64D 11/06 244/119 |
| 2016/0200417 A1* | 7/2016 | Eilken | B64F 5/10 244/129.1 |
| 2017/0211284 A1* | 7/2017 | Nguyen | B64C 1/18 |
| 2019/0248499 A1* | 8/2019 | Grether | B64D 11/0696 |

FOREIGN PATENT DOCUMENTS

| | | |
|---|---|---|
| DE | 10 2005 045 181 A1 | 4/2007 |
| DE | 10 2007 011 619 B4 | 7/2008 |
| EP | 0922632 A2 | 6/1999 |
| FR | 2930521 A1 | 10/2009 |
| FR | 2937303 A1 | 4/2010 |
| FR | 2957050 A1 | 9/2010 |
| WO | 9809860 A1 | 3/1998 |
| WO | 2007033640 A1 | 3/2007 |

* cited by examiner

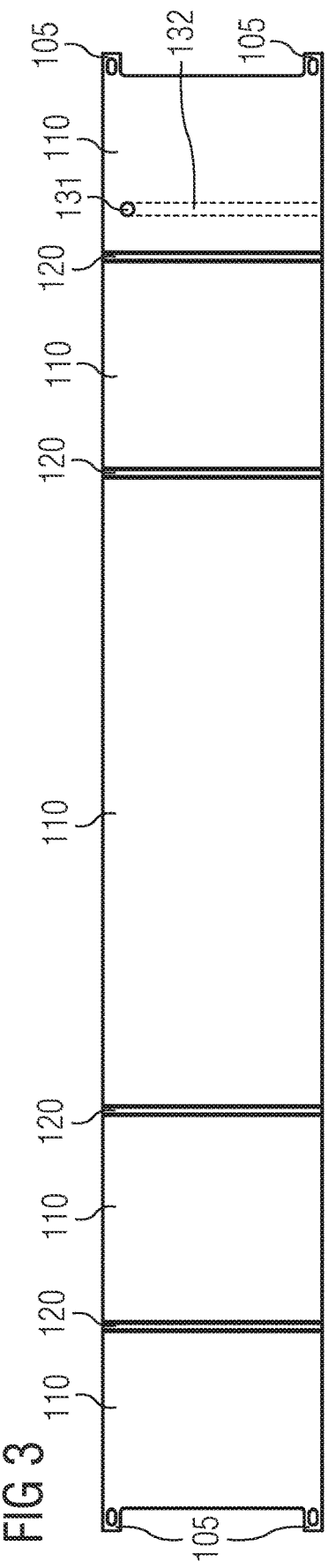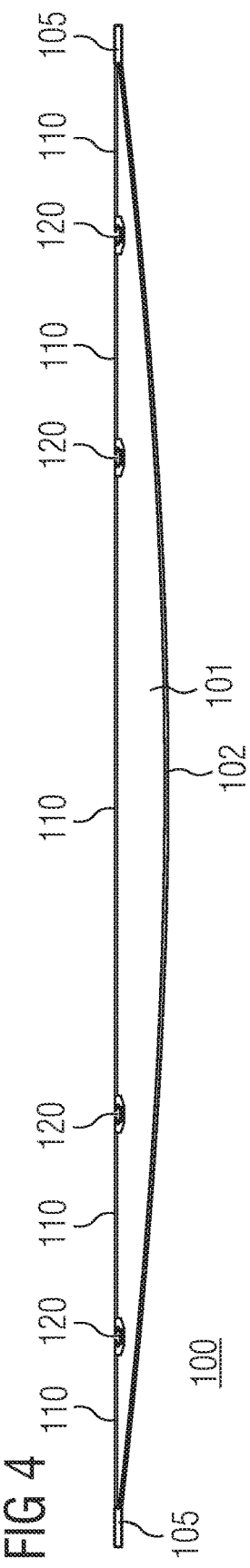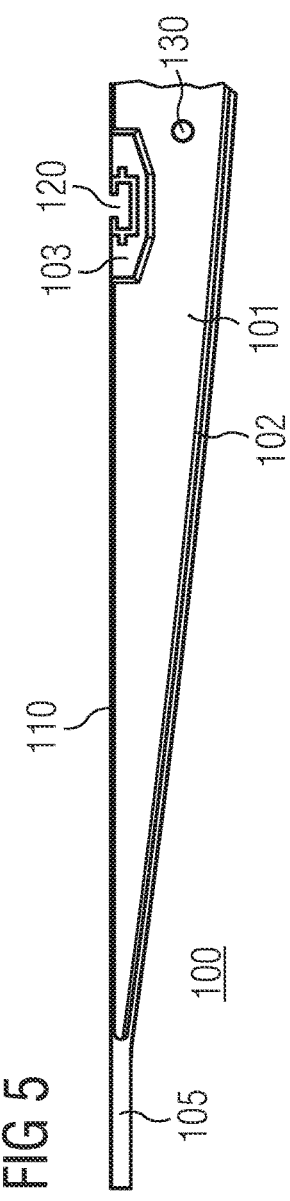

Detail Y

FLOOR ASSEMBLY COMPRISING A MONOLITHIC FLOOR ELEMENT, AND AIRCRAFT REGION AND AIRCRAFT COMPRISING A FLOOR ASSEMBLY

CROSS-REFERENCES TO RELATED APPLICATIONS

This application claims the benefit of the German patent application No. 10 2017 220 378.1 filed on Nov. 15, 2017, the entire disclosures of which are incorporated herein by way of reference.

BACKGROUND OF THE INVENTION

The present invention relates to a floor assembly comprising a monolithic self-supporting floor element, an aircraft region comprising such a floor assembly, an aircraft comprising such an aircraft region, and to the use of a floor assembly for the installation of a cabin floor in an aircraft. In particular, the present invention relates to a floor assembly, aircraft region, aircraft and use of a floor assembly, wherein the floor assembly comprises a monolithically designed, self-supporting floor element which extends transversely with respect to the longitudinal direction of the aircraft over a region between two opposite sides of a frame.

Current cabin floors in aircraft are produced from longitudinal members and floor panels attached and fastened thereon. The longitudinal members span generally two supporting structures which are arranged in the hold region of the aircraft and form opposite side walls of the hold region that run in the longitudinal direction of the aircraft. A part of the supporting structures consist, for example, of a horizontal and vertical carrier arranged transversely with respect to the longitudinal direction of the aircraft, wherein the horizontal carrier is fastened to a frame of the aircraft and extends in the direction towards the center of the aircraft. At the end facing the center of the aircraft, the horizontal carrier is mounted on the vertical carrier which, in turn, runs downwards and is fastened there to a lower point of the frame of the aircraft.

Depending on the arrangement of the cabin floor within the aircraft, in particular the floor panels, but also the longitudinal members, have to be adapted to different load situations. Thus, in regions in which monuments are provided, for example galley regions, toilets, etc., because of the fittings and the trolleys containing food and beverages for the passengers being stored in the galley region, significantly higher loads and torques arise than is the case in the seating region of the cabin. The passenger seats are generally fastened to seat rails which are mounted on the longitudinal members of the cabin floor. The floor panels in the seating region of the cabin therefore have to absorb lesser loads.

In order to satisfy these different load situations, but at the same time to allow the aircraft operators as great a flexibility as possible in the division of the cabin, one or more regions of the cabin floor are reinforced and can therefore carry the increased loads of a monument (in particular, a galley kitchen). In particular in the entry region of the aircraft, in which most monuments are provided, a certain portion (what is referred to as a flex zone) is provided with a stronger cabin floor. Such a portion can extend, for example, over several meters in the longitudinal direction of the aircraft. This makes it possible for the aircraft operator to install monuments (in particular heavy galley kitchens) inside the flex zone, but also to provide rows of seats in the aircraft. Of course, the stronger longitudinal members and stronger floor panels of the flex zone have a greater weight.

SUMMARY

The present invention is directed towards an object of providing a floor assembly which is lightweight and nevertheless permits the necessary flexibility in the division of the cabin of the aircraft. Furthermore, the present invention is directed to an object of providing an aircraft region and an aircraft comprising a corresponding aircraft region that comprise a lightweight floor assembly and permit the necessary flexibility for dividing the cabin, and also rapid installation.

According to a first aspect, a floor assembly for an aircraft has at least two supports which are configured to be fastened to opposite sides of a frame of the aircraft. For example, the floor assembly can have a multiplicity of supports which are fastened in pairs to opposite sides of a frame of the aircraft. A frame forms part of the fuselage of the aircraft and is arranged substantially perpendicularly to a longitudinal axis of the aircraft, and accordingly forms a cross section of the fuselage of the aircraft. The frame can extend over the entire circumference of the fuselage or at least over the predominant part of the circumference. For example, the frame can, on both sides, adjoin an aircraft element forming the fuselage floor.

Alternatively, the at least two supports, or the multiplicity of supports arranged in pairs, can also each be fastened to a stringer on opposite sides of the aircraft. A stringer likewise forms part of the fuselage of the aircraft and runs substantially parallel to the longitudinal axis of the aircraft. The outer skin of the aircraft is generally arranged and fastened on a multiplicity of stringers, while the frames substantially form the cross-sectional shape of the fuselage of the aircraft and stiffen the stringers.

Furthermore, the floor assembly comprises a monolithic, self-supporting floor element comprising at least two longitudinal members, a floor plate arranged on the longitudinal members and a respective connecting element arranged at each end of each of the longitudinal members. A monolithic floor element is understood here as meaning a floor element which, in the finished state, constitutes a component which cannot be broken up into individual components without being destroyed. Of course, the monolithic floor element can be produced from individual components which are connected to one another in such a manner that they form a monolithic floor element. For example, the individual components can be joined together by welding, adhesive bonding and/or riveting, or can be joined together in the form of a multiplicity of pre-pregs (premanufactured fiber composite components), which are assembled and subsequently cured together, to form the monolithic structural element.

The floor element can be fastened to the frame or stringer by fastening of each connecting element to a corresponding support. The support can be fastened directly to the frame or stringer. Alternatively, the support can be integrated in the frame or stringer, i.e., can be formed integrally with the rest of the frame/stringer. The support here is dimensioned to be as small as possible, and therefore, although the floor assembly can be fastened thereto, the support cannot project unnecessarily far into the interior of the fuselage of the aircraft. For example, the support can merely extend 5 cm to 10 cm in the Y direction (i.e., parallel to the transverse axis of the aircraft) from the frame or stringer into the interior of the fuselage. As a result, lever forces can be reduced by the introduction of force from the floor assembly into the fuselage structure of the aircraft.

In one variant, the connecting elements of the floor element can be fastened releasably to the respective support. For example, screw connections and/or plug-in connections can be provided between connecting element and support and can be released at any time without being destroyed. Similarly, plug-in connections can be provided with a securing pin and can be released at any time by release of the securing pin and/or removal of a bolt.

Furthermore, the floor plate can extend substantially completely over the region between the opposite sides of the frame. The floor plate can at least partially overlap the supports here. The floor plate can also extend in the direction of the longitudinal members at least between two supports fastened in pairs. The longitudinal members are longer here than the floor plate and jut out under the floor plate. Owing to the self-supporting floor element, the supports can be of a small size and can have a small extent into the interior of the aircraft. This furthermore permits the floor assembly, and in particular the floor plate, to take up or fill the entire space between the two opposite supports, i.e., to extend (virtually) continuously over the entire interior of the aircraft (as viewed transversely with respect to the longitudinal direction of the aircraft). In other words, the floor plate can either virtually or completely take up the entire intermediate space in the interior of the aircraft between two opposite supports. The floor plate can optionally also overlap at least one of the opposite supports.

By contrast to previous floor constructions with floor panels, the number of floor panels adjacent to one another and therefore the number of necessary seals between floor panels can thereby be reduced. The monolithic floor element thus permits a continuous floor plate which manages without joints running in the transverse direction of the floor element (joints running in the longitudinal direction of the aircraft). Since the introduction of sealing material is generally associated with a curing time of the joint material, the production time of a cabin floor with the monolithic floor element described here is significantly reduced and the susceptibility of the cabin floor to damage is reduced.

The monolithic floor element not only reduces the weight of the floor assembly, but also reduces the number of required components for producing a cabin floor. Previous cabin floors have been assembled from a plurality of elements (for example, longitudinal members and floor panels) which have had to be screwed, riveted and/or adhesively bonded to one another in the aircraft fuselage. These working steps to be undertaken in the aircraft fuselage are completely omitted in the case of the floor assembly described here. In addition, the monolithic floor element can be premanufactured and only later completely fitted into the aircraft. In addition, identical supports can also be used throughout the aircraft, irrespective of the position within the aircraft. As a result, only one type of support has to be produced and stored and can be used for each floor type of the aircraft. For example, the same support can be used for an aircraft cabin or a hold compartment floor and for each region in the longitudinal direction of the aircraft, irrespective of the later use of the region.

In one variant, the monolithic floor element can be produced at least in sections from a composite material. For example, the monolithic floor element can be produced integrally from a fiber-reinforced plastic. This also increases the strength of the floor element against impact forces, such as, for example, of objects (tool, items of luggage, kitchen utensils, etc.) striking against the floor element.

Alternatively or additionally, the floor plate, at at least one of its ends facing the connecting elements, can have a foot angle. A foot angle is an end of the floor plate extending upwards (away from the longitudinal member). The foot angle—also referred to as dado angle—can overlap with, adjoin and/or can be connected to, the side panel or dado panel of the interior paneling of the aircraft. A closed cabin paneling of the aircraft can therefore be produced rapidly and simply. Since the floor plate extends very close to the frames of the aircraft fuselage, the connection to the side paneling (dado panel) can easily be produced. The foot angle can be arranged perpendicularly to the floor plate. Alternatively, the foot angle can also be arranged not at a right angle to the floor plate, for example at an angle of between 90° and 120°, preferably between 95 and 110° and in particular 105°. The angle between floor plate and foot angle can be adapted to a curvature of the frames and/or curvature of the side paneling (dado panel) in the region just above the floor element.

In one refinement of the floor assembly, the monolithic floor element can comprise at least one crossmember which is arranged perpendicularly to the longitudinal members. The at least one crossmember can also be formed integrally with the other components of the floor element. This also reduces the production time of the cabin floor. The floor plate is also arranged on the crossmember, and therefore a continuous flat floor can be brought about by means of the floor assembly. Furthermore, the crossmember is connected to the longitudinal member of the floor element in such a manner that loads of the crossmember are dissipated into the longitudinal member.

Alternatively or additionally, the monolithic floor element can comprise one or more crossbars. A crossbar forms a further supporting component of the self-supporting floor element, the component running obliquely with respect to the longitudinal member. The crossbar here can merely constitute a stiffening of the floor plate (in order to reduce vibrations) or can be additionally connected to the longitudinal member in such a manner that the loads of the crossbar are dissipated into the longitudinal member. The crossbar can also be formed integrally with the remaining components of the floor element. In the case of a refinement with a crossmember, the crossbar also runs obliquely with respect to the crossmember and can optionally be connected to the crossmember in order to transmit loads in the crossmember.

In a further refinement, the longitudinal member (and the optional crossmember and the optional crossbar) can be arranged below the floor plate. A lower edge of the longitudinal member can have a rectangular, triangular, ellipsoidal or parabolic profile relative to the floor plate. The shape of the longitudinal member can be adapted here to the forces to be supported. Alternatively or additionally, the shape of the longitudinal member can be adapted to objects arranged or installed below the floor assembly, in order to provide sufficient space for them. For example, the lower edge of the longitudinal member can be moved away from a support towards the center of the longitudinal member in a linearly curved manner from the floor plate until a maximum height of the longitudinal member is reached. From there, the lower edge of the longitudinal member can run parallel to the floor plate. The lower edge here can have a symmetrical shape with respect to a center plane of the floor assembly, the center plane being perpendicular to the longitudinal axis of the longitudinal member. The parallel profile of the lower edge of the longitudinal member can extend over a region of the floor element that will be arranged above a hold compartment or other compartment in the aircraft, and therefore a uniform ceiling height of the (hold) compartment can be obtained.

The longitudinal member can thus have at least one web. In the case of a plurality of webs, the webs run substantially parallel to one another and parallel to the longitudinal axis of the floor element. A web can have a different extent in the Z direction (perpendicularly to the longitudinal direction and transverse direction of the floor element) along its profile in the longitudinal direction of the floor element. For example, a web can have its greatest extent in the Z direction in the center of the floor element (as viewed in the longitudinal direction) where the greatest bending torques of the floor element prevail. In the case of the arrangement of a plurality of parallel webs, the webs can have a different extent from one another in the Z direction or all of the webs can have the same extent in the Z direction. For example, in the case of three parallel webs, a central web can have a greater extent in the Z direction than the two webs arranged next to it. Similarly, a constant extent in the Z direction can be present in a central region of the floor element in order to obtain a continuously identical height of a compartment below the lower edge of the web.

A flange lying opposite the floor plate can optionally also form part of the longitudinal member. The flange can be formed integrally here with the one or more webs. In the case of a plurality of webs, the flange can protrude over the outer webs in the transverse direction of the floor element or can only overlap the intermediate space between the webs.

Alternatively or additionally, a region of the longitudinal member between the web and the floor plate has a reinforcement. The reinforcement can be arranged, for example, on one or both sides of one or more webs (as viewed in the transverse direction of the floor element) or can be formed integrally there with the web. A reinforcement can be in the form of ribs, a stiffening foam and/or a honeycomb structure. In each case, the reinforcement prevents or reduces the risk of stretching or tearing and of buckling of the web of the longitudinal member.

The two longitudinal members (or optionally more than two longitudinal members) of the floor element can be arranged within a central region of the floor plate. In other words, the floor plate projects on the right or left beyond the respective longitudinal member, as viewed in the longitudinal direction of the floor element. Similarly, the longitudinal members can also be arranged on opposite sides of the floor element, i.e., can be arranged on the longitudinal sides or longitudinal edges of the floor plate. Each longitudinal member is fastened here to two supports. For example, supports can be provided on a frame or stringer or can be integrated therein and in each case two connecting elements of two floor assemblies arranged next to each other in the longitudinal direction of the aircraft can be fastened to the supports. Each self-supporting floor element is therefore secured against tilting, while the supports can be configured as simply as possible in order to absorb loads in the Z direction.

In an alternative variant, the floor element has an individual longitudinal member which is arranged, for example, centrally below the floor plate. A floor element shaped in such a manner has a T-shaped cross-sectional shape. The advantage of such a floor element resides in the lower weight. However, the floor element has to be secured on at least one of the supports against tilting (about the Y axis of the aircraft, i.e., the longitudinal axis of the floor element). Alternatively or additionally, the floor elements of a plurality of floor assemblies arranged next to one another in the longitudinal direction of the aircraft can also be connected to one another in a force-transmitting manner, as a result of which tilting of the floor elements is likewise prevented. For this purpose, connecting elements can be provided at the side edges (or side regions below the floor plate) of the floor element, the connecting elements producing a force-fitting and/or form-fitting, force-transmitting connection with corresponding connecting elements of adjacent floor elements.

In one variant embodiment, the web can comprise a slot running in the longitudinal direction of the at least one longitudinal member. The slot constitutes a recess or opening in the web. The slot here has a greater extent in the longitudinal direction of the longitudinal member than in a direction perpendicular to the floor plate. For example, the slot can have a height (extent in a direction perpendicular to the floor plate) of 3 to 10 mm; the slot can preferably have a height of 5 mm. The slot can be located centrally in the longitudinal direction of the longitudinal member and can have a length (extent in the longitudinal direction of the longitudinal member) which corresponds to a width of a passenger aisle in an aircraft. The slot is arranged in the web in particular wherever a passenger aisle is later located. Of course, a plurality of slots can also be arranged in the longitudinal direction of the longitudinal member, for example if more than one passenger aisle is provided on the floor plate of the floor element. In particular, a slot is not provided wherever seat rails are located in the floor element.

The slot makes it possible to damp vibrations continuing into the web from the floor plate. In particular, vibrations from the floor plate are reduced or not transmitted at all into regions of the floor element in which seats are fastened (with the aid of seat rails). On account of the monolithic floor element, walking passengers (with rolling luggage) or cabin crew (with trolley), in particular when transferring from one floor plate to the next, may trigger transverse force vibrations (in the plane of a web of the longitudinal member) which are transmitted via the rest of the floor element and the seat rails into seats fastened therein. This is unpleasant for the seating seated passengers.

Further vibration damping can be obtained in the form of a damping element which is located below the floor plate in the at least one region in which a passenger aisle or slot is provided in the longitudinal member. The damping element can be fastened, for example in a panel-like manner, on an underside of the floor plate or can be integrated in the floor plate. For example, the damping element can be provided between the two longitudinal members and can extend in the longitudinal direction of the floor element to the extent that the slot is provided. By means of this form of damping, vibrations are likewise removed from the floor plate, as a result of which a passenger walking on the floor plate has a more pleasant sensation since the floor plate yields less. The damping element can be produced from a foam, can be produced from a hard rubber material, can have a honeycomb structure, and/or can be a reinforcement (greater material thickness) of the floor plate.

In a further variant, the support can have at least one projection (or stub). The projection can extend, for example, parallel to the Z axis (i.e., perpendicularly to a plane formed by the installed floor plate). The connecting element here has an opening which is configured to receive the projection. For example, the connecting element can be an extension of the longitudinal member and/or of the floor plate, in which extension a perpendicularly running opening, cavity or bore is formed. The opening, cavity or bore can therefore be placed onto the projection and can receive the latter.

Alternatively, the projection can also extend in the Y direction (i.e., parallel to the longitudinal direction of a fitted floor element). In this case, the opening can be located on an end side of the longitudinal member and/or of the floor plate. For easier fitting of such a floor element, the floor assembly can have, on one side of a frame, a support with a projection which extends in the Y direction, while a support with a projection which extends in the Z direction is provided on the opposite side of the frame, as viewed in the Y direction.

Likewise alternatively, the support has at least one opening, wherein the connecting element is configured to be inserted into the opening of the support. In other words, the connecting element has a projection, as is described above for the support, while the support has a corresponding opening.

Alternatively in turn, the support and the connecting element can have openings which can be arranged one above another, and therefore a bolt or pin can be guided through the openings of the support and of the connecting element. A connection which is releasable without destruction can thereby be produced between support and connecting element easily and cost-effectively by use of customary connection means.

Optionally, an elastic material can be arranged in at least one of the openings. For example, an elastic polymer, such as a hard rubber, can be provided in the opening. As a result, firstly, vibrations which would otherwise be transmitted between floor element and support can be damped. Secondly, tolerances can also be compensated for. The elastic material here takes on a supporting function at least in the directions defined by the plane in which the opening lies.

In one variant, the projection is formed by a separate component having a stub which is configured to be fastened to the support or to the connecting element. As a result, first of all the support can be fastened to the frame and only subsequently can the projection (stub) be positioned at the necessary location. Tolerances can thereby be compensated for. For this purpose, the component can optionally have, on a side facing the support or the connecting element, a tooth profile which corresponds to a tooth profile on the support or the connecting element. The tooth profiles can extend here in a defined direction, and therefore each tooth has an extent in the defined direction. In other words, the tooth profile is like a folded plane. The defined direction can be, for example, the transverse direction of an aircraft and therefore the longitudinal direction of the longitudinal member and floor element. As a result, the component having the stub can be oriented in the longitudinal direction of the aircraft (transverse direction of the floor element) and inserted into the tooth profile of the support or of the connecting element and subsequently fixedly connected to the support or connecting element.

The distance between the teeth determines the offset here at which the component having the stub can be fastened in order to compensate for tolerances. Of course, the corresponding tooth profiles can also comprise a multiplicity of pyramids arranged in grid form, and therefore the component having the stub can be oriented in two directions (for example, longitudinal direction and transverse direction of the aircraft) and can be subsequently fixed to the support or connecting element. Furthermore, bores or openings in the support or connecting element for receiving a fastening element (for example, screw or bolt) can only be provided if the component is oriented with the tooth profile. Alternatively, the bores or openings can be larger than the cross section of the fastening means in order to permit moving of the components. For example, the difference in the sizes may correspond to a multiple of the distance between two teeth.

In a further variant embodiment, the floor assembly can comprise a seat rail. The seat rail can be integrated here in the floor plate or inserted into the floor plate. For example, during production of a floor element from a composite material, the seat rail can be produced by the composite material. Alternatively, a premanufactured seat rail can be inserted in the composite material before the completion thereof and can be held in a force- and/or form-fitting manner in the composite material by completion thereof.

The longitudinal member and/or the floor plate can have a recess in which the seat rail runs. For example, the recess in which the seat rail is subsequently fastened can be provided during the production of the floor element. For example, the seat rail can be screwed, riveted or adhesively bonded in the recess. The floor plate here can furthermore be formed continuously over the entire longitudinal extent of the floor element such that no joints arise between adjacent floor panels.

Furthermore, the floor assembly can comprise at least one coupling device which is arranged at and/or in one of the longitudinal members. The coupling device can optionally also be arranged at and/or in a crossmember and/or crossbar. The coupling device has a bolt receptacle into which a coupling bolt can be inserted. The coupling device can be arranged here at/in the floor assembly in such a manner that it lies opposite a corresponding coupling device of an adjacent floor assembly when the two floor assemblies are installed in an aircraft. The coupling bolt can thereby be inserted through the bolt receptacles of both coupling devices and can couple the two floor assemblies mechanically to each other.

In an alternative refinement, the coupling device can either have a coupling bolt which extends away from the longitudinal member perpendicularly to the longitudinal axis thereof and away from the floor plate, or a bolt receptacle which extends perpendicularly to a longitudinal axis of the longitudinal member and into a region below the floor plate. In this case, a separate coupling bolt does not have to be provided since it is already present in one of the coupling devices. However, the coupling devices of two floor assemblies have to be configured in such a manner that, when the floor assemblies are fitted into an aircraft, the corresponding coupling devices lie opposite one another and the coupling bolt of the one coupling device engages in the bolt receptacle of the other coupling device.

The coupling device can be arranged in such a manner that, in a top view of the floor plate, the coupling bolt juts out under the floor plate while the bolt receptacle is arranged below the floor plate. Two floor elements can therefore be fitted next to each other into an aircraft, where, in each case, one coupling bolt of a first floor element engages in a bolt receptacle of a second floor element and therefore couples the two floor elements.

Owing to the orientation of the coupling bolt and the bolt receptacle, vertical forces (in the Z direction) can be transmitted between the two floor elements. As a result, vibrations between two floor elements, for example because of a walking passenger or cabin crew with a trolley, are reduced or avoided. Horizontal forces in the Y direction (transverse direction) of the aircraft can optionally also be transmitted between coupling bolt and bolt receptacle. The coupling bolt is likewise optionally freely movable in the bolt receptacle in the X direction (longitudinal direction) of the aircraft. As a result, stresses between the floor elements can be avoided.

Alternatively or additionally, the coupling device can be attached to one end of a seat rail or can be integrated in a seat rail. Since the seat rail has to correspond to a seat rail of an adjacent floor element, the seat rail generally extends over the entire width of the floor plate (the floor element). Respective ends of the seat rail of respective floor elements therefore correspond and provide the optimum space for a coupling device without additional structural elements having to be provided on the floor element.

The coupling device can be provided in the form of an end wall on a seat rail or crossmember. Either a coupling bolt or a bolt receptacle can be arranged here on the end wall. In a simple variant for the production, an identically designed end wall with an opening is provided for each coupling device. If, in the fitted state of the floor elements, two coupling devices of two adjacent floor elements lie opposite each other, a coupling bolt can be pushed through the two openings of the two coupling devices and secured in this position. For example, the coupling bolt can have, on one side, a head which is greater than the cross section of the openings, and, on the other hand, can have a securing option (for example bore for securing pin or thread for securing nut).

Alternatively or additionally, the coupling device can comprise at least one compensating element which is installed in a bolt receptacle or on the coupling bolt. For example, a compensating ring can be inserted into the bolt receptacle or placed onto the coupling bolt. The compensating element is manufactured from an elastic material, and therefore the coupling bolt, when the latter engages in the bolt receptacle, has a small freedom of movement within the context of the elastic deformation of the compensating element. This makes it possible to compensate for tolerances which may be present during the production of the floor assemblies and, in particular, during the production of the coupling devices and also after the fitting of the floor assemblies into an aircraft.

Likewise alternatively or additionally, the coupling device can be configured to receive a connection element which is configured to be connected to an interior component. In particular, the interior component is a vertically arranged structural element in the aircraft fuselage, via which high loads of the floor element are introduced into the fuselage structure of the aircraft (for example, crash loads). By means of the position of the coupling devices on two adjacent floor elements, the interior component can be coupled in a simple manner to the supporting structure of the floor element. For example, the connection element can be fork-shaped (or U-shaped), wherein one limb in each case is assigned to a floor element of the two adjacent floor elements. In the event of a separate coupling bolt, the connection element can be designed in such a manner that in each case one limb overlaps an end side of a respective coupling element, wherein an opening in the respective limb coincides with an opening in the respective end side. The coupling bolt can subsequently be guided through the end sides of the coupling elements and the limbs of the connection element in order to secure the floor elements and also the connection element. A coupling device for coupling to the interior component can be provided at the lower end of the connection element.

Furthermore, the monolithic floor element can comprise a line and/or one or more connections for supply lines. Lines and/or connections for the supply of appliances arranged on the floor assembly can thus be integrated in the monolithic floor element. For example, power lines, data lines, water lines, drainage lines, etc. and correspondingly connections therefor can be provided, and therefore seats, monuments and other aircraft components provided on the floor element can be connected. The lines permit passage through the floor element in the Z direction (i.e., perpendicularly to the plane formed by the floor plate). The connections can be arranged on that side of the floor plate which lies on top in the fitted state of the floor element, and therefore seats, monuments and other aircraft components can be connected with line lengths which are as short as possible. Furthermore, the lines can run towards the ends of the floor element, i.e., can run in the transverse direction of the aircraft in the fitted state of the floor element. Most aircraft have channels, in which lines run in the longitudinal direction of the aircraft (X direction), in at least one triangular region below the cabin floor on one side of the aircraft. The lines can thus be connected in the floor elements to the longitudinally running lines with as short a line length as possible.

Furthermore, certain types of floor element which comprise only a certain selection of lines and connections can be provided. This makes it possible to provide floor elements which are preconfigured for certain structures (seats, monuments and other aircraft components). For example, a type of floor element for rows of seats can be equipped with power lines and/or data lines and corresponding connections, while a type of floor element for galleys can be equipped with water lines, drainage lines and/or power lines and corresponding connections. Corresponding further types of floor element, such as floor elements on which at least one toilet is arranged, are also conceivable. As a result, floor elements can be used specifically for the use of the corresponding regions in the aircraft, as a result of which weight can be saved, for example by avoiding otherwise oversized flex zones. On account of the identical supports used throughout the aircraft, the floor elements for certain uses can be attached at any location in the aircraft. This facilitates the fitting of the floor in the aircraft and also permits greater flexibility in later reconfigurations of the aircraft.

In addition, the monolithic floor element can have connections with which the line(s) running in the monolithic floor element can be connected to corresponding lines of adjacent floor elements. As a result, by connection of the lines of adjacent floor elements, a continuous line can be produced in the X direction (longitudinal direction of the aircraft) with the fitting of the floor elements. In other words, each floor element can have a line arranged in a T-shaped manner, with there being two connection possibilities to adjacent floor elements and a connection possibility (upwards) for the connection to seats or monuments. Alternatively or additionally, the monolithic floor element can also have holders in order to lay lines in the X direction of the aircraft. The holders can be provided, for example, within and/or below a longitudinal member of the floor element. The holders are either provided fixedly at identical predetermined positions of all of the floor elements or arranged displaceably such that they can be aligned in the Y direction of the aircraft.

In one variant, the floor plate extends in a plane. Alternatively, the floor plate can have a curvature, for example from a center of the floor plate to the ends of the floor element, at which the connecting elements are arranged. A corresponding upwardly directly curvature can be adapted in such a manner that, during the loading of the floor assembly (after installation of seats, monuments and other objects), the floor plate is located in a plane.

According to a further aspect, an aircraft region has at least two frames arranged parallel to one another in the longitudinal direction of the aircraft (airplane) and at least one floor assembly according to the first aspect. The aircraft region here can have frames of identical size, and therefore the cross section of the entire aircraft region (as viewed in the longitudinal direction of the aircraft) is substantially identical. Alternatively, the size of the frames can also change. For example, the cross section of the aircraft can be reduced in the front or rear region of the aircraft. In a corresponding manner, the length of the floor elements of the assemblies in the aircraft region also differs. Specially shaped floor elements, in which one longitudinal member is longer than another one, in order to correspond to a tapering of the aircraft cross section, are also provided for this purpose.

In one variant, a width of the floor element of the at least one floor assembly corresponds to a distance between the two frames in the longitudinal direction of the aircraft. In other words, one floor element is required per pair of frames in order to produce a continuous cabin floor in the aircraft. A joint between two mutually adjacent floor elements can be located here in a plane which is defined by a frame. Alternatively, the joint can also run parallel to the plane defined by a frame. For example, if the self-supporting floor element has a longitudinal member which is fastened to supports of an individual frame, or if the self-supporting floor element is fastened to stringers.

This form of the floor elements makes it possible to dispense with flex zones. Thus, as early as in the preliminary stages, in accordance with the instructions of the operator of the corresponding aircraft, floor elements for seat regions (for example, floor elements with seat rails) can be installed and corresponding floor elements configured for greater loads can be installed only in the predetermined regions for monuments (toilets, galley kitchens, etc.). As a result, the size of the cabin floor which is sufficiently reinforced for the loads of monuments can be reduced, and therefore weight is saved.

In addition, the floor elements of the floor assemblies can easily be exchanged since, on account of their small width, they fit through openings in the aircraft (for example, loading hatches or passenger doors). This permits conversion of the aircraft to different requirements of the operator or to the requirements of a new operator. Owing to the fastening of the connecting elements of the floor elements to just a few supports, the fastening being releasable without being destroyed, such a conversion of the cabin floor of the aircraft can be carried out rapidly and cost-effectively.

In one variant embodiment, the aircraft region can be a region of the cabin floor for passengers. In this case, the at least one floor assembly is located approximately in the vertical center of the fuselage of the aircraft. In another refinement, an aircraft region of an intermediate floor may be involved. The intermediate floor formed by the at least one floor assembly can likewise be provided for passengers, for example in the case of a double-story cabin structure. In a further refinement, the aircraft region can be the floor region of a fuselage of an aircraft. In this case, the floor elements of the at least one floor assembly can form a hold compartment floor and can be formed with appropriate strength for the loads occurring in the hold compartment. Of course, the floor elements in the floor region of the fuselage can also be configured for passengers, and therefore for smaller loads. It is thus possible to exchange heavy floor elements which are necessary for a hold compartment for lightweight floor elements for passengers. For example, two or three supports can be attached to a frame on each side of the aircraft, and therefore two or three floor assemblies arranged one above another can be formed, and the aircraft can be flexibly provided with two or three floors arranged one above another, depending on requirements.

According to yet another aspect, an aircraft comprises an aircraft region, according to the last-described aspect.

According to another aspect, the use of a floor assembly according to the first-described aspect for installation of a cabin floor in an aircraft is described. The floor assembly according to the first aspect is thus suitable for installation of a cabin floor after interior components that are to be provided have been attached to a fuselage of the aircraft. For example, all aircraft components which are fastened directly to the fuselage (such as lines, air conditioning systems, avionics systems, structural reinforcements, floor and walls of the hold region, etc.) can first of all be fitted into the aircraft. Only subsequently can floor assemblies for installation of the cabin floor be inserted.

Since the floor of the hold region is configured to receive significantly greater loads than the floor of a passenger cabin, the interior construction of the aircraft can also be carried out with robots which are mounted on the floor of the hold region or moved over the floor of the hold region. The robots here are capable also of carrying out fittings in the upper cabin region and ceiling region of the aircraft since the cabin floor comprising the floor assemblies described here does not yet have to be installed. As a result, the interior construction of the aircraft can be automated and significantly accelerated.

On account of their small width, the monolithic, self-supporting floor elements can be brought into the interior of the aircraft through normal openings in the aircraft. This permits the installation of a cabin floor even after the front and rear region of the aircraft have already been attached to the fuselage. For example, the floor elements of the floor assembly described here can be passed through a loading hatch or a passenger door of the aircraft.

Furthermore, it is likewise possible to convert an aircraft with little downtime. Floor elements for a seat region of the aircraft can thus be exchanged for floor elements for a monument region (for example a galley region and/or toilet region), or vice versa. A hold region can also be at least partially repurposed into a further passenger region.

The refinements, variants and aspects described here can be combined as desired, and therefore further variant refinements which are not explicitly described are included.

BRIEF DESCRIPTION OF THE DRAWINGS

Exemplary embodiments of the invention will be described in more detail below with reference to the drawings.

FIG. 3 shows schematically a top view of a floor element, FIG. 4 shows schematically a side view of a floor element, FIG. 5 shows schematically a detail of a side view of a floor element with a seat rail.

DETAILED DESCRIPTION OF THE PREFERRED EMBODIMENTS

According to the present invention, a floor assembly for an aircraft is provided, and an aircraft region (airplane region) comprising frames and a floor assembly, a corresponding aircraft and use of a floor assembly are described.

Figure 1:
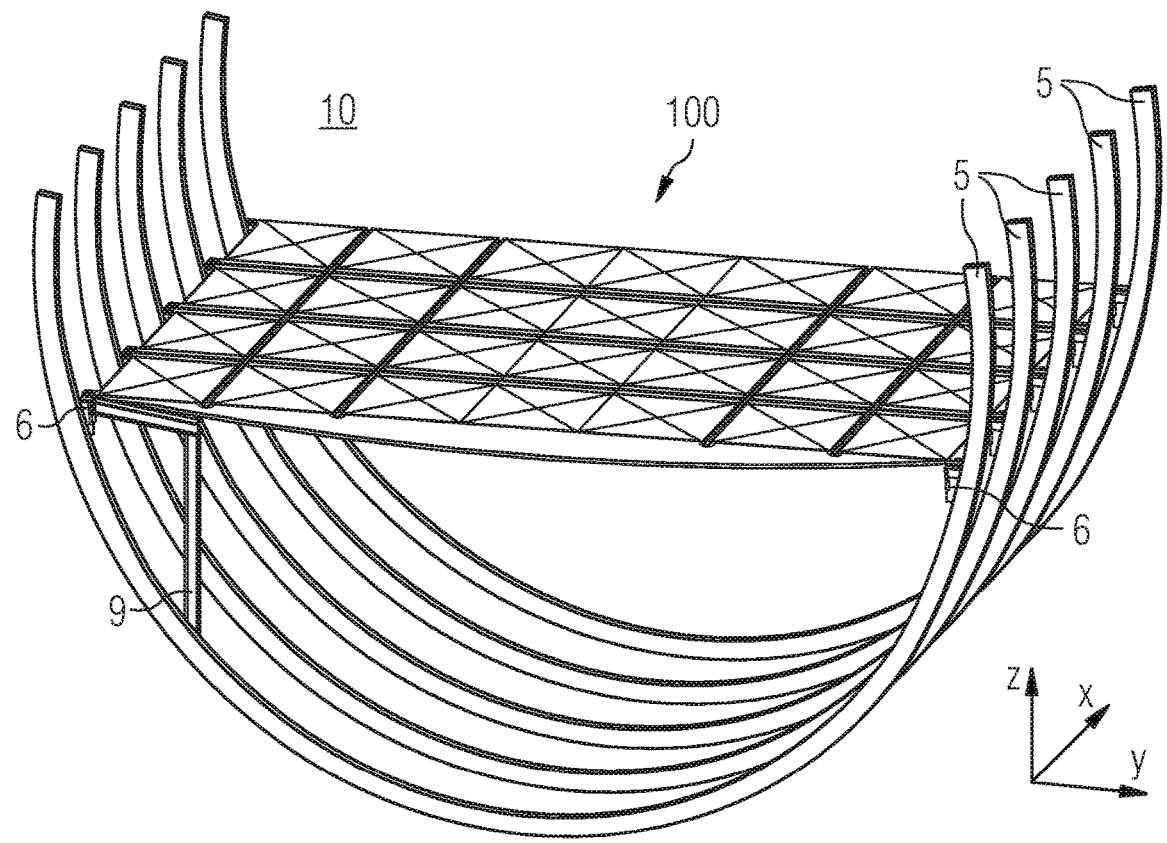
FIG. 1 shows schematically a perspective view of a region of an aircraft with a plurality of floor assemblies.

FIG. 1 shows schematically a perspective view of a region 10 of an aircraft 1 comprising a plurality of floor assemblies. A floor assembly comprises at least two supports 6 which are fastened to opposite sides of a frame 5 of the aircraft 1. A frame 5 forms a cross section of the aircraft 1 and lies substantially in a cross-sectional plane of the aircraft 1 (a plane formed by the Z axis and Y axis, wherein the Y axis lies transversely with respect to the longitudinal direction (X axis) of the aircraft 1 and the Z axis runs perpendicularly to the X axis and Y axis). Each of the supports 6 can be attached subsequently to the frame 5 or alternatively can be produced integrally with the frame, i.e., integrated in the frame.

The floor assembly furthermore comprises a monolithic, self-supporting floor element 100. The floor element 100 is fastened to the frame 5 by attaching to corresponding supports 6. The aircraft region 10 illustrated in FIG. 1 comprises four floor elements 100. Each of the floor elements 100 can be fastened to at least one frame. In the refinement illustrated, each floor element 100 is fastened on each side to in each case two frames 5, each having a support 6.

The aircraft region 10 furthermore comprises interior components 9. For example, an interior component 9 in the form of a frame reinforcement can be provided. The frame reinforcement 9 serves firstly for absorbing loads in the event of a crash and secondly for forming a side wall of a hold region in the lower fuselage of the aircraft 1.

Figure 2:
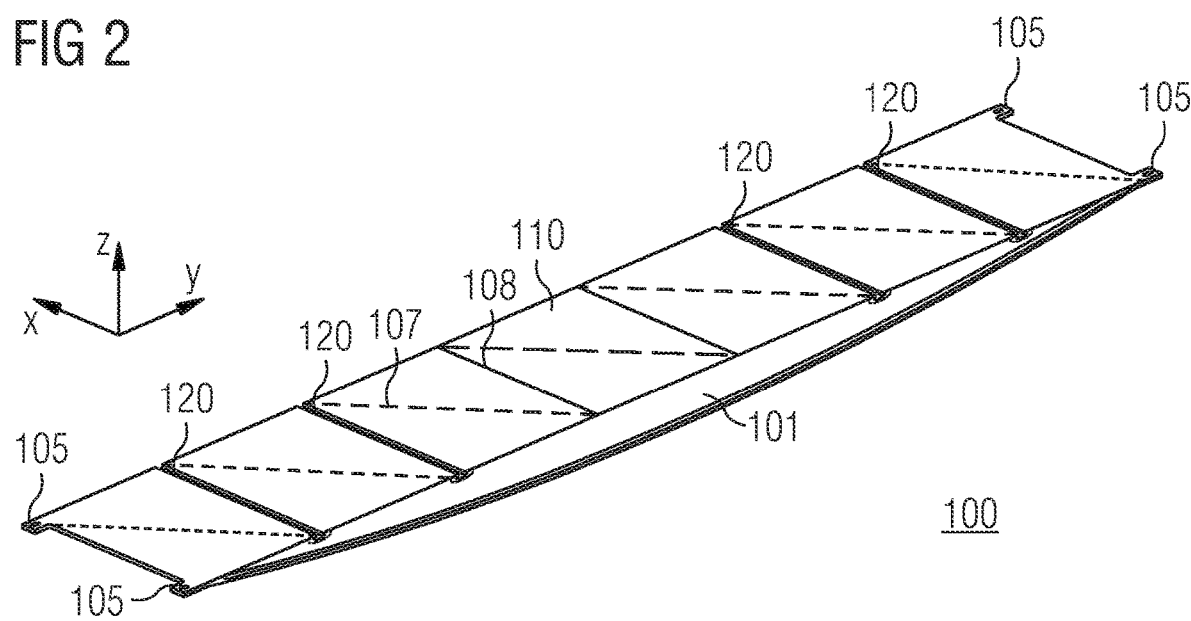
FIG. 2 shows schematically a perspective view of a floor element of a floor assembly.

FIG. 2 shows schematically a perspective view of a floor element 100 of a floor assembly. The floor element 100 can comprise at least one longitudinal member 101, a floor plate 110 arranged on the longitudinal member 101 and a respective connecting element 105 arranged at each end of the longitudinal member 101. Each of the connecting elements 105 serves for fastening the floor element 100 to a corresponding support 6 and therefore to a corresponding frame 5.

According to the refinement illustrated, the floor element 100 has two longitudinal members 101 which are each arranged on a longitudinal side of the floor element 100. Alternatively, an individual longitudinal member 101 can also be arranged in the center of the floor element 100, and therefore the floor element 100 has a T-shaped cross-sectional shape. The floor element 100 is monolithic and therefore self-supporting. All of the loads are conducted via the floor plate 110 and the at least one longitudinal member 101 into the connecting elements 105.

The monolithic floor element 100 can furthermore comprise at least one crossmember 108 which is arranged substantially perpendicularly to the at least one longitudinal member 101. Substantially perpendicularly means an arrangement here at a right angle +/−2°. Optionally, the floor element 100 can also comprise at least one crossbar 107 which extends obliquely with respect to the longitudinal member 101 and optionally also obliquely with respect to the crossmember 108. The crossbar 107 and the crossmember 108 are completely arranged below the floor plate 110, and therefore a continuous floor plate 110 can be obtained on the upper side of the floor element 100.

In the event that the floor element 100 is arranged in a region 10 of the aircraft 1 in which rows of seats for passengers (not shown) are intended to be provided, the floor element 100 can be provided with at least one seat rail 120.

FIG. 3 shows the construction of a floor element 100 in more detail in the form of a schematic top view of a floor element 100, while FIG. 4 shows the corresponding side view of the floor element 100. The floor plate 110 of the floor element forms an upper continuous surface of the floor element. The floor plate 110 can form the flooring of a cabin of the aircraft 100. Alternatively, a floor covering (not shown), for example a carpet, can also be attached to the floor plate 100. The at least one seat rail 120 can be integrated in the floor plate 110. In other words, the seat rail 120 can be formed by the floor plate 110 itself or can be fitted into the floor plate as a separate element. In each case, it is possible for the floor plate 110 to extend over the entire length and width of the floor element 100 and to be passed under the seat rail 120.

In the event that the floor element 100 is arranged in a region 10 of the aircraft 1 in which one or more monuments (such as, for example, a galley kitchen, a toilet, an intermediate wall, a cupboard, etc. not shown) is or are intended to be provided, the floor element 100 can be provided with a floor plate 110 completely arranged in a plane. In other words, the surface of the floor plate 110 is not interrupted by seat rails or other elements. A floor element 100 which is intended to be arranged below monuments can comprise a stronger floor plate 110 and a longitudinal member 101 of stronger design in order to absorb the higher loads of the monuments in comparison to passenger seats. The connecting elements 105 can also be configured to be reinforced in order to reliably transmit the higher loads into the supports 6.

The longitudinal member 101 of the floor element 100 is arranged below the floor plate 110 and can take on any desired form. The floor element 100 illustrated in FIG. 4 has a longitudinal member 101 with a parabolic or virtually circular-arc-shaped profile of its lower edge. A flange 102 can be attached to the lower edge of the longitudinal member 101 in order to increase the stability of the longitudinal member 101.

Furthermore, the monolithic floor element 100 can comprise a line 132. The line 132 can be in the form of a power line, data line, water line and/or drainage line. In a corresponding manner, one or more connections 131 of the line 132 is or are located on an upper side of the floor element 100, i.e., in the floor plate 110. Alternatively, the line 132 can also be an empty pipe which has a corresponding opening 131 in the floor plate 110. The arrangement of the one or more connections 131 can be standardized for certain types of monument (toilets, galley kitchens, etc.), but can also be undertaken depending on the requirements of the operator of the aircraft 1.

FIG. 5 shows schematically a detail of the side view of a floor element 100 with a seat rail 120. The seat rail 120 is accommodated in a recess 103 of the floor plate 110. In the refinement illustrated, the longitudinal member 101 also has a corresponding recess 103. For example, the recess 103 can be filled with a filling and/or adhesively bonding material, into which the seat rail 120 is inserted and therefore fastened. Alternatively, the recess 103 can also be composed of the same material as the monolithic floor element 100, wherein the seat rail 120 is accommodated in a force- and form-fitting manner during the production of the floor element 100. Likewise alternatively, the seat rail 120 can be produced directly from the material of the monolithic floor element 100, and therefore no additional components have to be fitted in the floor element 100. It can readily be seen in FIG. 5 that the floor plate 110 runs continuously below the seat rail 120 (forming the recess 103), and therefore no joints arise below the seat rail as was the case in earlier floor panels. Since no joint material has to be introduced and cured, the production time of the floor element 100 can be shortened.

In the refinement illustrated, the floor plate 110 and the flange 102 of the longitudinal member 101 converge at a longitudinal-side end of the floor element 100 and form the connecting element 105 or merge into the connecting element 105. Alternatively, the longitudinal member 101 and/or the flange 102 can also end before the connecting element 105, wherein the connecting element 105 is exclusively formed from the floor plate 110.

Finally, the floor element 100 also comprises one or more connections 130 which are formed, for example, on the longitudinal member 101. This connection 130 is connected to the line 132 (FIG. 3) or forms a further outlet of an empty pipe 132. The connection 130 serves for connecting the line 132 to a corresponding line 132 of an adjacent floor element 100. As a result, supply lines can be formed by the floor elements 100 throughout an aircraft region 10 in the longitudinal direction of the aircraft (X axis).

Figure 6:
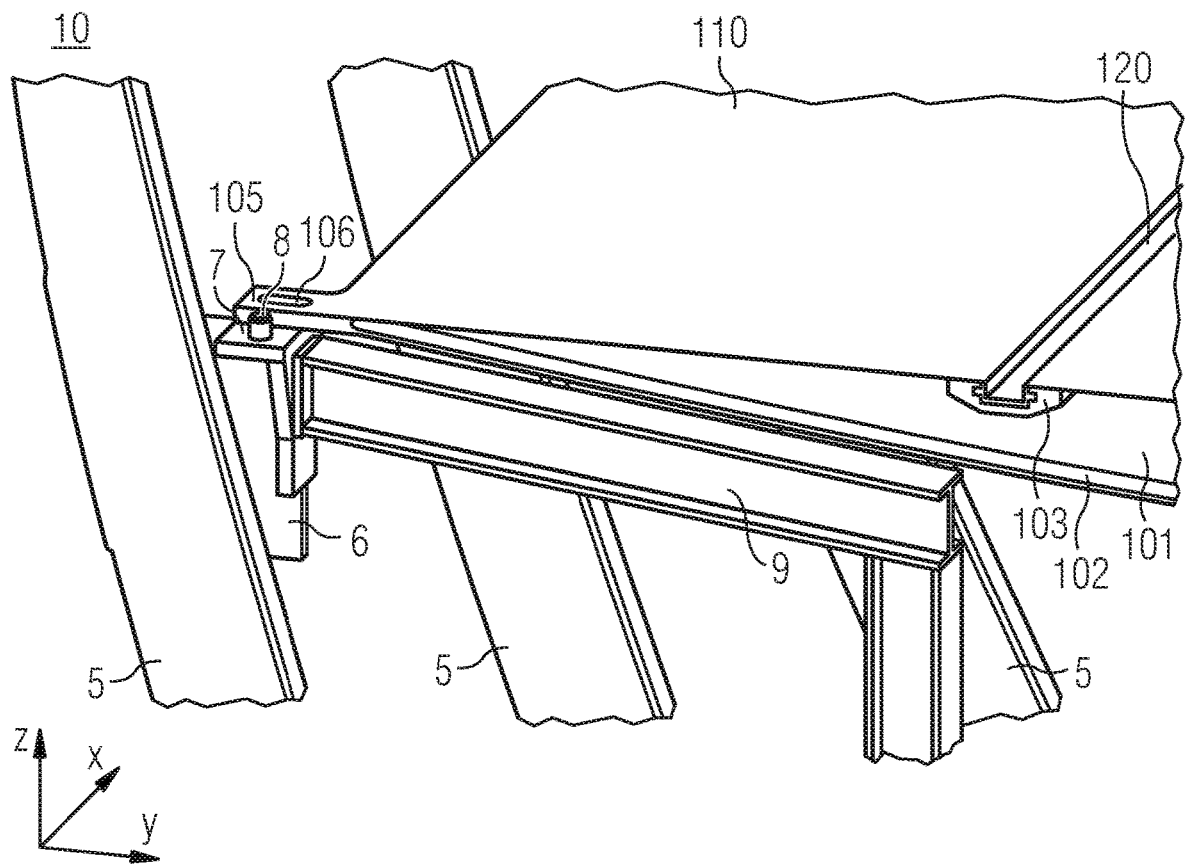
FIG. 6 shows schematically a perspective view of a detail of an aircraft region.

FIG. 6 shows schematically a perspective view of a detail of an aircraft region 10 showing three frames 5. A support 6 is arranged on at least one of the frames 5 or is integrated in the frame 5. The support 6 forms a horizontal supporting surface 7 which runs substantially parallel to the floor plate 110 of the floor element 100 (i.e., runs in the X and Y direction). The supporting surface 7 only has to be dimensioned in such a manner that the loads transmitted by a connecting element 105 of a floor element 100 can be absorbed and transmitted into the support 6 and on into the frame 5.

The support 6 can have at least one projection 8 which, for example, protrudes perpendicularly from the supporting surface 7 in the Z direction. The connecting element 105 here can have a corresponding opening 106 which is configured to receive the projection 8. The projection 8 therefore secures the floor element 100 against the floor element 100 sliding off from the support 6 by means of a movement of the floor element 100 in the X-Y plane. Furthermore, the projection 8 can also be designed in such a manner that the connecting element 105 can be secured. For example, the projection 8 can be dimensioned in such a manner that it juts out in the Z direction beyond an upper edge of the connecting element 105. A securing element (not shown), for example a securing pin or securing bolt or a securing nut, which can be screwed onto the projection 8, can be attached in the protruding portion of the projection 8. The securing element serves for fastening the floor element 100 in the Z direction.

Alternatively, the connecting element 105 can also have a corresponding downwardly directed projection (not shown), wherein the support 6 has an opening which corresponds to the opening 106 and in which the projection of the connecting element 105 can engage. It is also possible in this solution for a securing element to be provided which, for example, on a lower side of the crossbar 107, brings about securing in the Z direction with the projection of the connecting element 105.

FIG. 6 furthermore shows a further structural element 9 or interior component 9 of the aircraft 1. This serves primarily for stiffening the frame 5, in particular, in the event of a crash load. Furthermore, a vertical portion of the structural element 9 can serve for producing a side wall of a hold compartment arranged below the floor element 100. The substantially horizontally running portion of the structural element 9 can be adapted in such a manner that the longitudinal member 101 of the floor element 100 can run thereabove without contact. In other words, the structural element 9 has an upper edge with an inclination which corresponds to the profile of the lower edge or of the flange 102 of the longitudinal member 101, wherein an air gap is provided between the structural element 9 and the lower edge or the flange 102 of the longitudinal member 101. In the event of a crash load, the structural element 9 can limit deformation of the floor element 100 downwards in the Z direction. As a result, the floor element 102 can sag but continues to be supported by the structural element 9 in the event of a crash load. The height of the longitudinal member 101 (in the Z direction) can thereby be reduced since the load-bearing capability of the longitudinal member 101 has to be configured primarily for the normal load situation with supporting points exclusively on the support 6.

Figure 7:
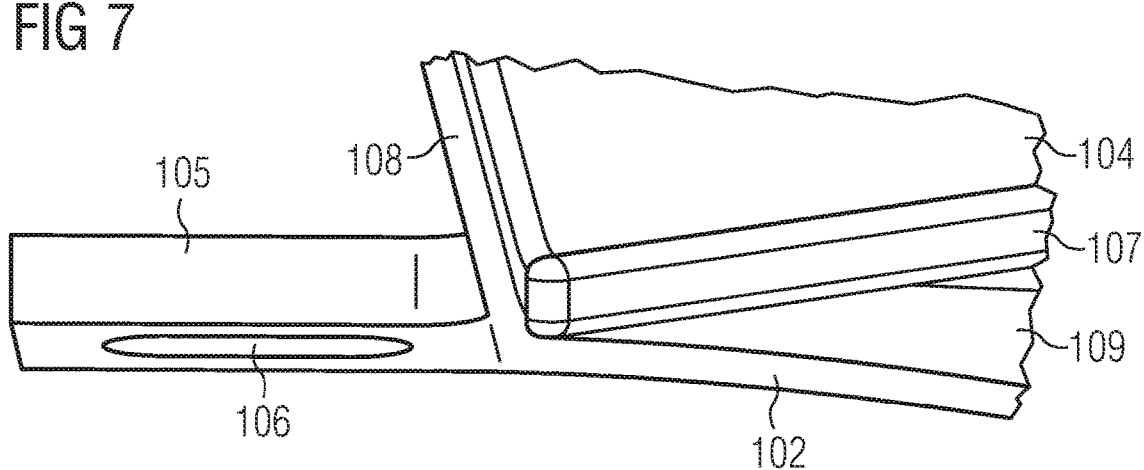
FIG. 7 shows schematically a perspective view of a detail of a floor element with a connecting element.

FIG. 7 shows schematically a perspective view of a detail of a floor element 100 with a connecting element 105 and shows, in particular, a bottom view of a floor element 100. The opening 106 of the connecting element 105 can be provided here at least on a lower side of the connecting element 105. Alternatively, the opening 106 can also reach through the entire extent of the connecting element 105 in the Z direction. At least one crossmember 108 which is arranged substantially perpendicularly to the at least one longitudinal member 101 can be arranged below the floor plate 110. Optionally, at least one crossbar 107 can also be provided which extends obliquely between the longitudinal member 101 and a crossmember 108. The longitudinal member 101, the crossmember 108 and the crossbar 107 can be produced here integrally (in one piece) with a lower side 104 of the floor plate 110 or alternatively can be produced in individual elements and connected continuously (adhesively bonded, welded) to the floor plate.

Footstep sound insulation or other damping can be provided on the lower side 104 of the floor plate 110. Alternatively or additionally, a reinforcement of the floor plate, for example in the form of a honeycomb structure or stiffening foam, can also be arranged on the lower side 104. The reinforcement can be provided, for example, in the case of a floor element 100 for monuments, in order to be able to absorb the higher loads.

A reinforcement (not illustrated) can optionally be arranged on the lower side or the upper side of the connecting element 105. As a result, the longitudinal member 101 can be produced continuously with a certain material thickness, wherein a reinforcement is provided in the region of the connecting element 105 for connection to the support 6.

A reinforcement 109 of the longitudinal member 101 can likewise be provided on the inner side or both sides of a longitudinal member 101. The reinforcement 109 can likewise be produced in the form of a honeycomb structure or a stiffening foam. Alternatively, the longitudinal member 101 can also have two webs which run parallel and, together with the flange 102 and the floor plate 110, form a rectangular cross section of the longitudinal member 101. The cavity of the longitudinal member 101 can likewise be filled by a reinforcement 109.

Figure 8:
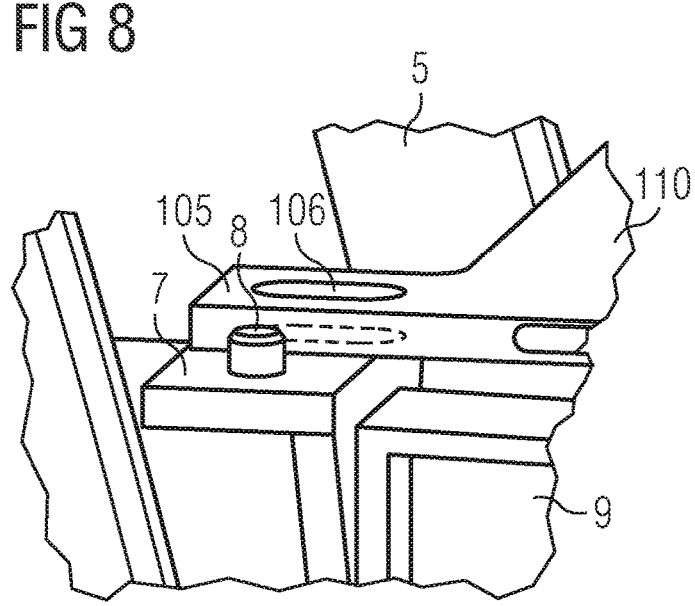
FIG. 8 shows schematically a perspective view of a detail of an aircraft region with a support and a connecting element of a floor assembly.

FIG. 8 shows schematically a perspective view of a detail of an aircraft region 10 with a support 6 and a connecting element 105 of a floor assembly. The support 6 here can have a supporting surface 7 which is dimensioned in such a manner that two connecting elements 105 of two adjacent floor assemblies can be arranged thereon. Such a support 6 can likewise have two projections 8 or other securing mechanisms for the connecting elements 105 of the adjacent floor assemblies, wherein only one projection 8 is visible in FIG. 8 in the region of the support 6, in which a connecting element 105 is (still) not located.

Figure 9:
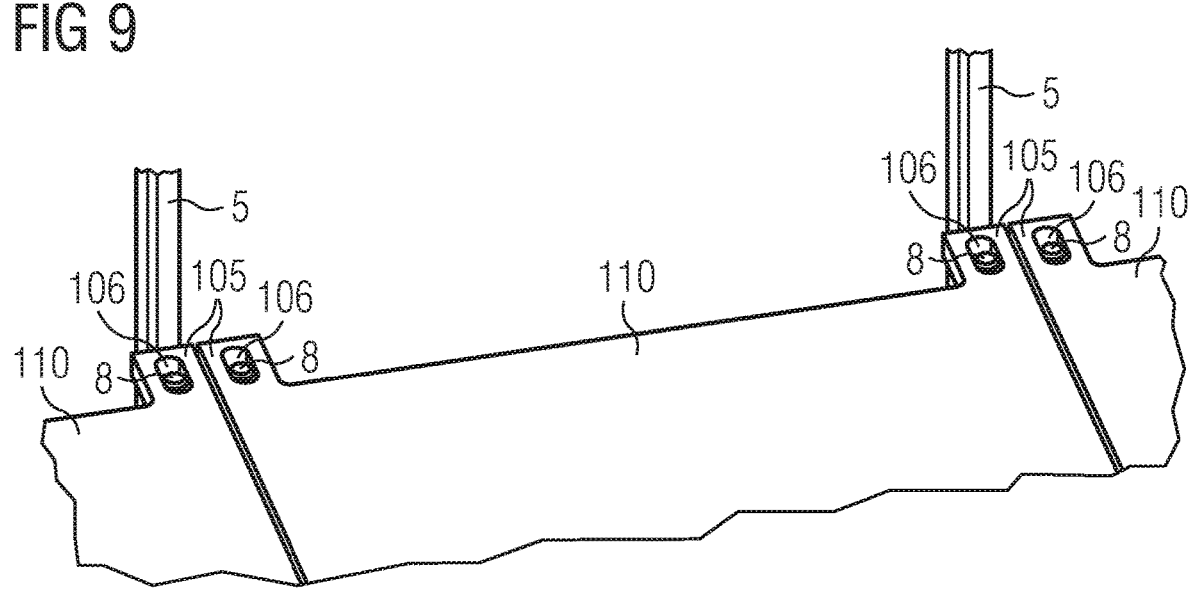
FIG. 9 shows schematically a perspective view of a detail of an aircraft region with two frames and a plurality of floor elements.

FIG. 9 shows in a correspondingly schematic manner a perspective view of a detail of an aircraft region 10 with two frames 5 and a plurality of floor elements 100. The connecting elements 105 of two adjacent floor elements 100 divide a support 6. It can be seen in FIG. 9 that each support 6 has two projections 8 which each project through an opening 106 of a connecting element 105 of the adjacent floor elements 100. Securing mechanisms (not shown) can be attached to the illustrated upper side in order to secure the connecting element 105 against a movement upwards in the Z direction.

Figure 10:
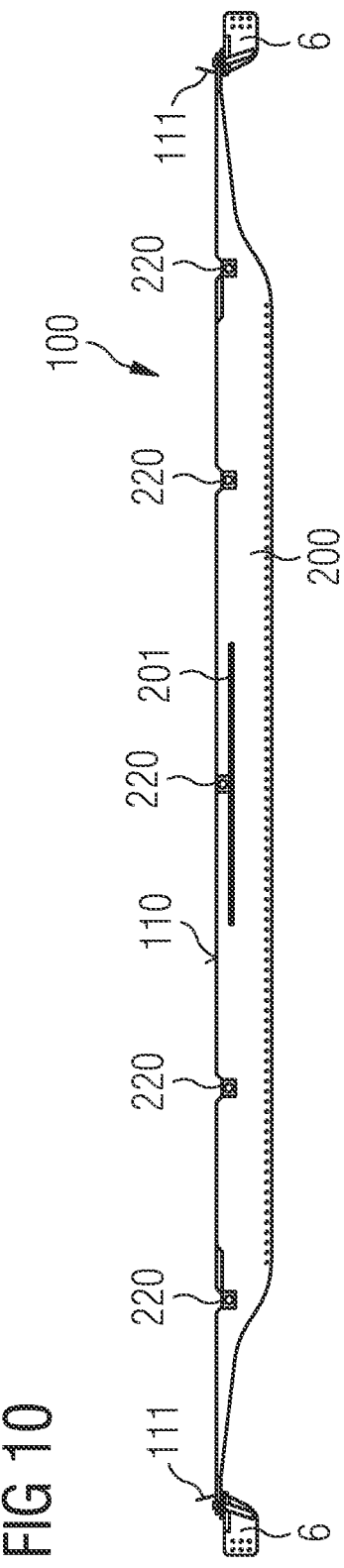
FIG. 10 shows schematically a side view of a floor element according to one variant.
Figure 11:
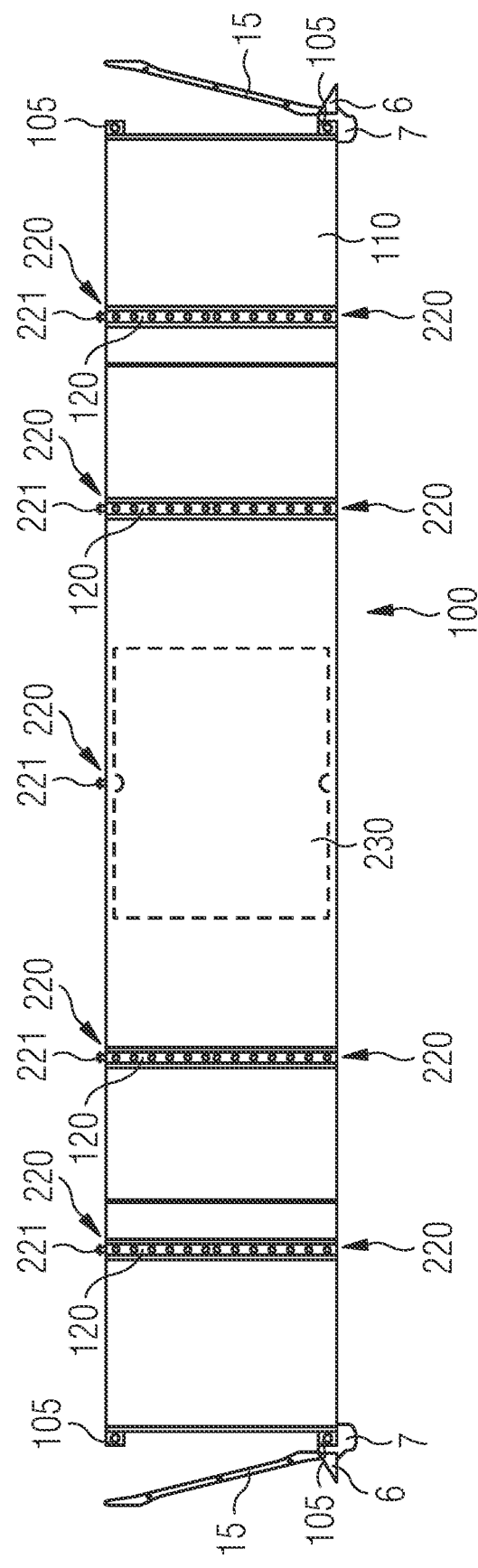
FIG. 11 shows schematically a top view of a floor element according to the variant from FIG. 10.

FIG. 10 shows schematically a side view of a floor element 100 according to a variant, wherein the structure of the floor element 100 for the most part corresponds to that of the variant from FIGS. 3 to 5. Only the differences between the two variants will therefore be explained here. FIG. 11 shows schematically a top view of the floor element according to the variant from FIG. 10.

The longitudinal member 200 of the floor element 100 is arranged below the floor plate 110 and can take on any desired form. In the variant illustrated, the longitudinal member 200 has a constant height in the central region, and therefore a compartment located below the floor element 100 can have a constant ceiling height.

Furthermore, the longitudinal member 200 has a slot 201 which runs in the longitudinal direction of the longitudinal member 200. The slot 201 is provided in a region in which no seat rails 120 are arranged, but rather, as here in the central region of the floor element 100, a passenger aisle is provided. The slot 201 which has an extent of approx. 3 to 10 mm (for example 5 mm) in the Z direction (vertically), permits damping of vibrations from the floor plate 110 due to passengers walking in the aisle or crew members, in particular if the latter move trolleys or other objects through the aisle on the floor plate 110.

For additional damping in this region of the floor element 100, a damping element 230 (illustrated by dashed lines in FIG. 11) can be arranged below the floor plate 110. The damping element 230 can have a width (in the longitudinal direction of the floor element 100) corresponding to the length of the slot 201, but can optionally also be shorter or longer than the slot 201. The height of the damping element 230 can correspond to a distance of the slot 201 from the floor plate 110. If the damping element 230 is spaced apart from the longitudinal member 200, the damping element 230 can also take on a greater height than the distance (otherwise, the damping element 230 would impair the function of the slot 201).

A plurality of coupling devices 220 are provided on the floor element 100. The coupling devices 220 can be arranged at and/or in one of the longitudinal members 101, 200, but can also be arranged at and/or in a seat rail 120 next to the longitudinal member 101, 200, and/or at and/or in a cross-member 108. As illustrated in particular in FIG. 11, each coupling device 220 on a side of the floor element 100 in each case comprises a coupling bolt 221 (FIG. 15) which juts out under the floor plate 110, i.e., goes beyond the width of the floor plate 110 in the X direction (transverse direction of the floor element 100). On the opposite side of the floor element 100, coupling devices 220 each having a bolt receptacle 222 (FIG. 16) are provided. As a result, during the fitting of a floor element 100, the latter can be connected via the coupling devices 220 to the coupling devices 220 of an adjacent floor element 100 in such a manner that at least vibrations in the Z direction are damped since they are transmitted from one floor element 100 into the adjacent floor element 100. Of course, the coupling bolt 221 can also be designed as a separate element in order, after two floor elements 100 are fitted into the aircraft fuselage, to couple (to connect) two opposite coupling devices 220 of the two floor elements 100.

In addition, FIG. 11 also illustrates a cross strut 15 which forms a support for a support 6 with respect to an adjacent frame 5 which differs from the frame 5 to which the support 6 is fastened. The cross strut 15 can be fastened to the adjacent frame 5 at a different height than the support 6. As a result, torques can also be transmitted from the support 6 into the primary structure 5 of the aircraft 1, for example because of the admission of loads of two adjacent floor assemblies 100 into the support 6.

Figure 12:
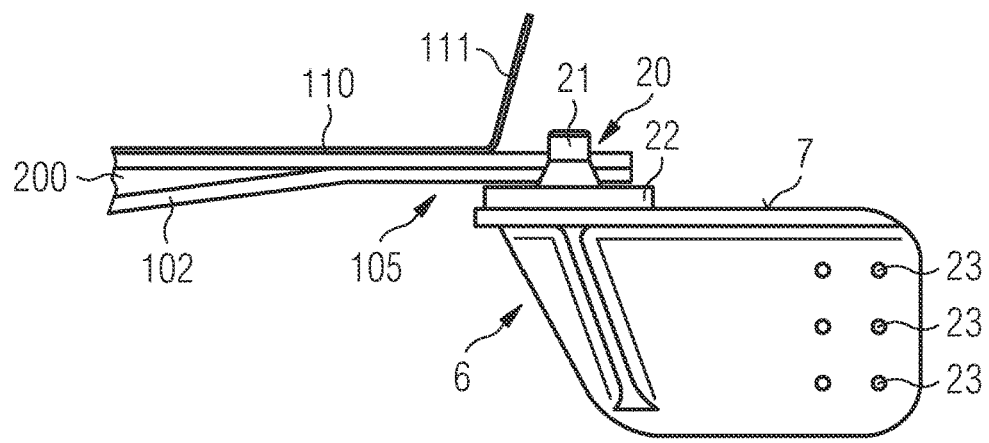
FIG. 12 shows schematically a detailed side view of a support and a connecting element.
Figure 13:
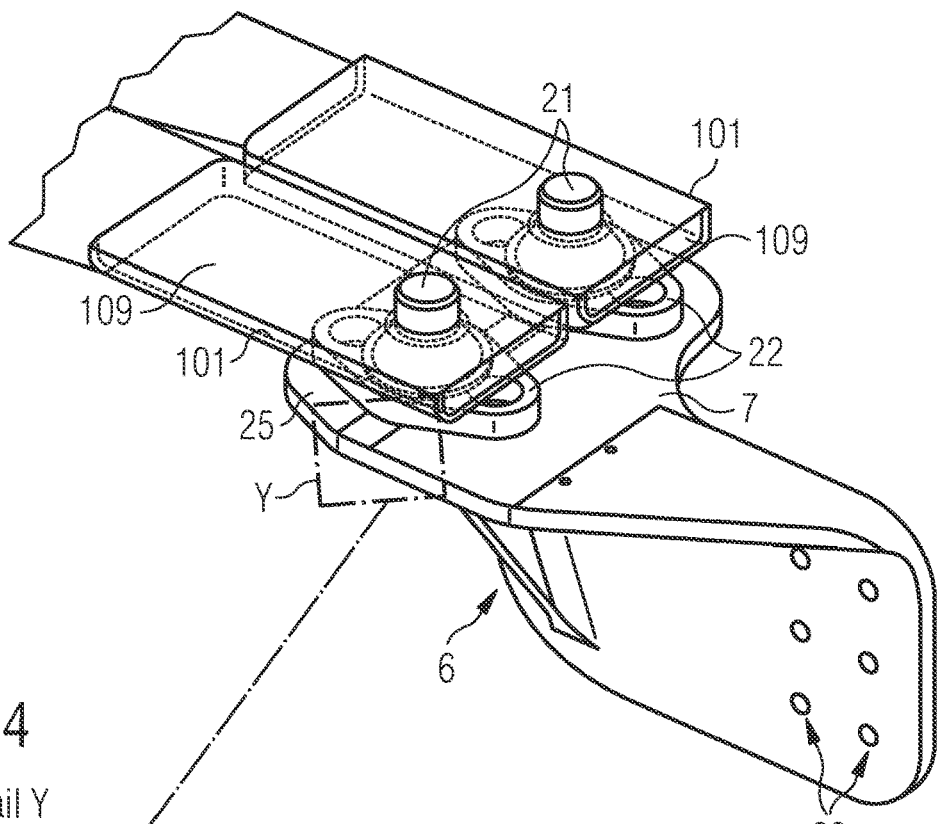
FIG. 13 shows schematically a perspective view of the support from FIG. 12 with two connecting elements.

FIG. 12 shows schematically a detailed side view of a support 6 and of a connecting element 105. FIG. 13 shows schematically a perspective view of the support 6 from FIG. 12 with two connecting elements 105. The support 6 has connecting options 23 with which the support 6 can be fastened to a frame 5. For example, there can be bores or holes 23 through which fastening bolts or fastening screws for fastening to the frame 5 can be guided. Of course, the support 6 can also be fastened to the frame 5 by means of adhesive bonding or welding.

Figure 14:
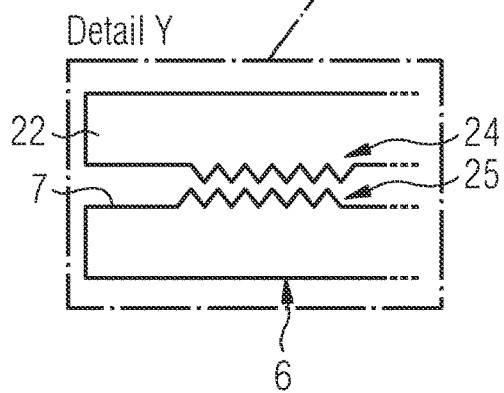
FIG. 14 shows schematically a detail between support and component having a stub from FIG. 13.

The supporting surface 7 of the support 6 has an asymmetrical shape since the support 6 can be fastened in a simple manner on one side of the frame 5 but requires space for two floor elements 100 arranged symmetrically with respect to the frame 5. A tooth profile 25 which is illustrated in more detail in FIG. 14 is provided on the supporting surface 7. The tooth profile 25 serves for receiving a corresponding tooth profile 24 of a component 20 having a stud 21. The tooth profile 24 of the component 10 is provided on a lower side of a plate-like portion 22 of the component 20. By means of the corresponding tooth profiles 24, 25, the component 20 can be arranged on the supporting surface 7 in such a manner that the component has a position with respect to the frame 5, in which tolerances between two frames 5 are compensated for. In other words, the position of the component 20 can be selected in such a manner that the stud 21 coincides with the opening 106 of a connecting element 105. The tooth profile 24 is suitable for the arrangement of two components 20, and therefore two studs 21 can be optimally positioned for two adjacent connecting elements 105. Only subsequently can the components 20 be fastened to the support 6, for example by means of screws, bolts or similar fastening means.

Figure 15:
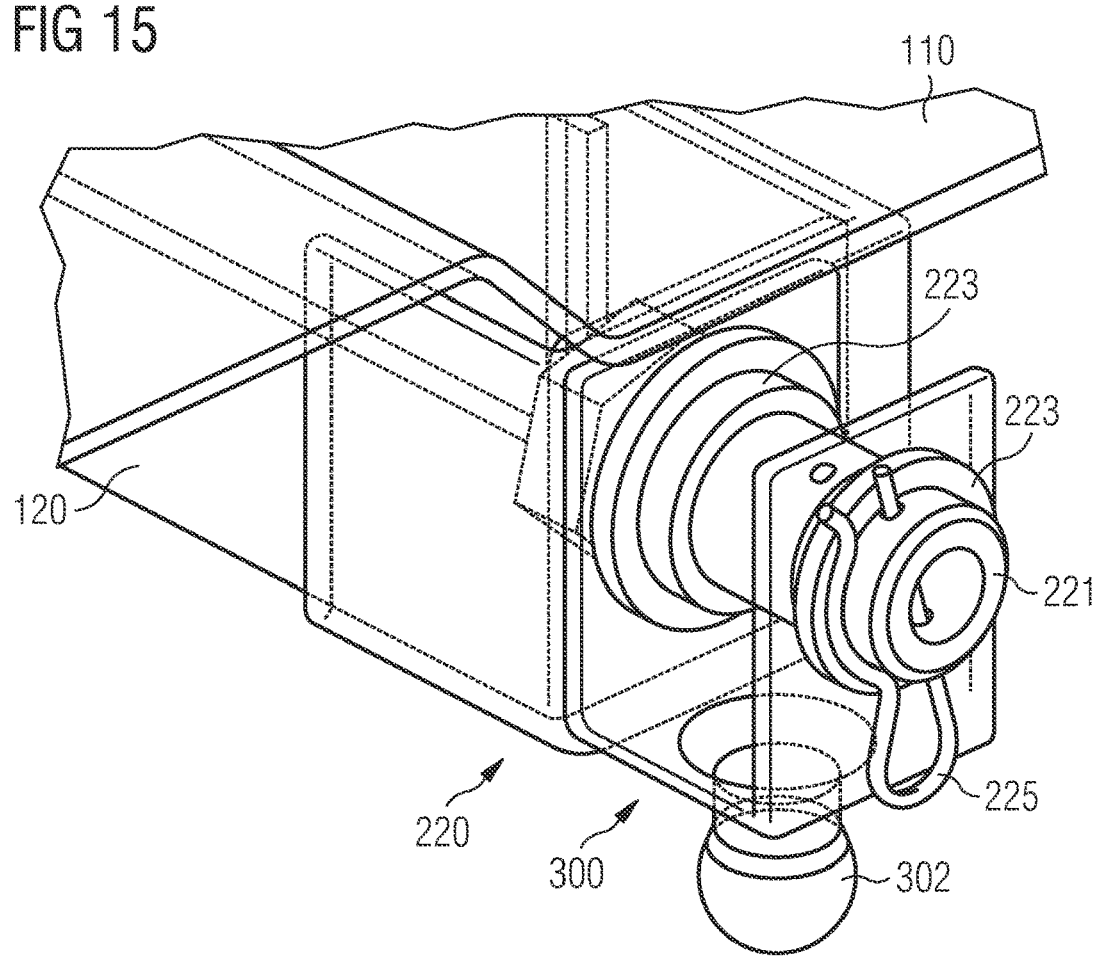
FIG. 15 shows schematically a perspective view of a coupling device.

FIG. 15 shows schematically a perspective view of a coupling device 220, In particular, the coupling device 220 is illustrated in a manner arranged at the end of a seat rail 120, for example fastened thereto or integrated therein. The coupling device 220 illustrated in FIG. 15 has an end-side plate through which a coupling bolt 221 is guided in a corresponding opening. The coupling bolt 221 can alternatively also be a fixed (integral) component of the end-side plate. The length of the coupling bolt 221 is selected in such a manner that it juts out under the floor plate 110, as illustrated in FIG. 11.

Furthermore, the coupling device 220 can have compensating rings 223, as a result of which, tolerances between two adjacent coupling devices 220 can be compensated for (only one coupling device 220 is illustrated in FIG. 15 for better clarity). The compensating rings 223 can be manufactured from an elastic material. In other words, the play of the coupling bolt 221 can be compensated for in corresponding coupling devices 220. However, tolerances of two adjacent floor assemblies 100, and in particular of the coupling devices 220 which are then opposite each other, can also be compensated for. Furthermore, a securing pin 225 can be provided in order to protect the coupling bolt 221 against slipping out of a corresponding coupling device 220.

Figure 16:
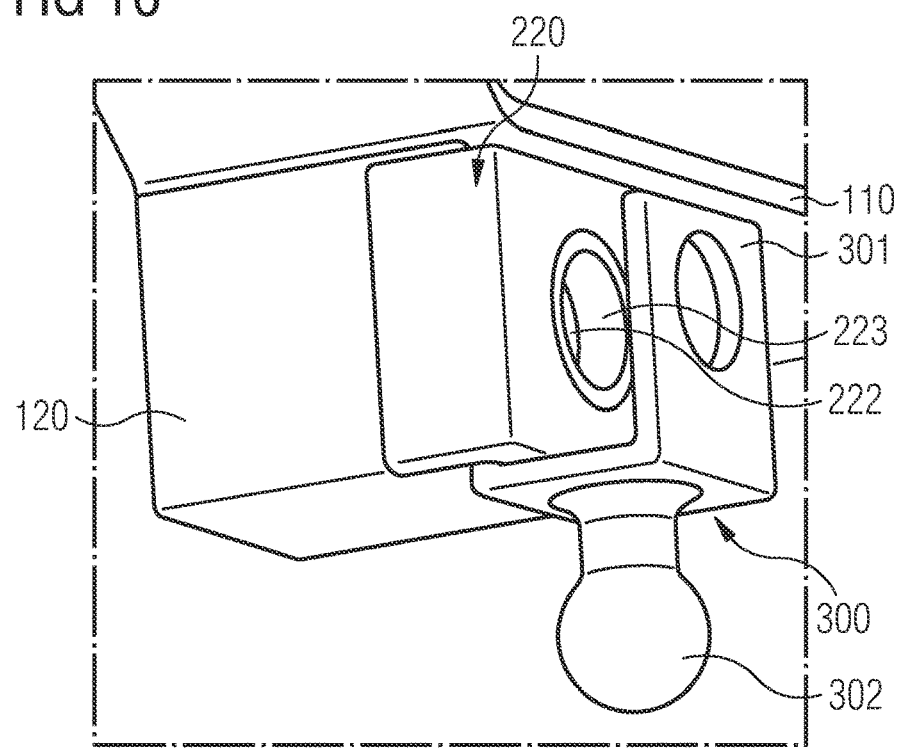
FIG. 16 shows schematically a perspective view of a connection element to a coupling device.

FIG. 15 also shows a connection element 300 which is illustrated in more detail in FIG. 16. FIG. 16 also shows a coupling device 220 with a bolt receptacle 222, wherein the coupling device 220 is likewise arranged/fastened at the end of a seat rail 120.

The connecting element 300 serves for the connection to an interior component 9, for example a frame structure 9 (FIG. 6). The frame structure 9 can be connected via a ball head 302 at the lower end of the connection element 300. The ball head 302 can have play in the Z direction in relation to the frame structure 9, and therefore the two connected floor elements 100 can oscillate in the Z direction and a mechanical coupling between ball head 302 and frame structure 9 occurs only in the event of more extreme loads (for example, crash loads). The connection element 300 is of fork-shaped (or U-shaped) design, as a result of which it is inserted very easily and rapidly into the two opposite coupling devices 220 and is secured by the coupling bolt 221. As a result, the number of required components for connection to the frame structure 9 can be significantly reduced and the fitting can be simplified.

The second coupling device 220 (not illustrated in FIGS. 15 and 16) of the adjacent floor element 100 can interact in a symmetrical manner with the connection element 300. After the fitting of two adjacent floor elements 100, the connection element 300 can be pushed in from below such that each limb of the connection element 300 lies on an inner side of the respective coupling device 220. By subsequent pushing in of the coupling bolt 221, the coupling devices 220 of the two floor elements 100 and also the connection element 300 can be connected.

Figure 17:
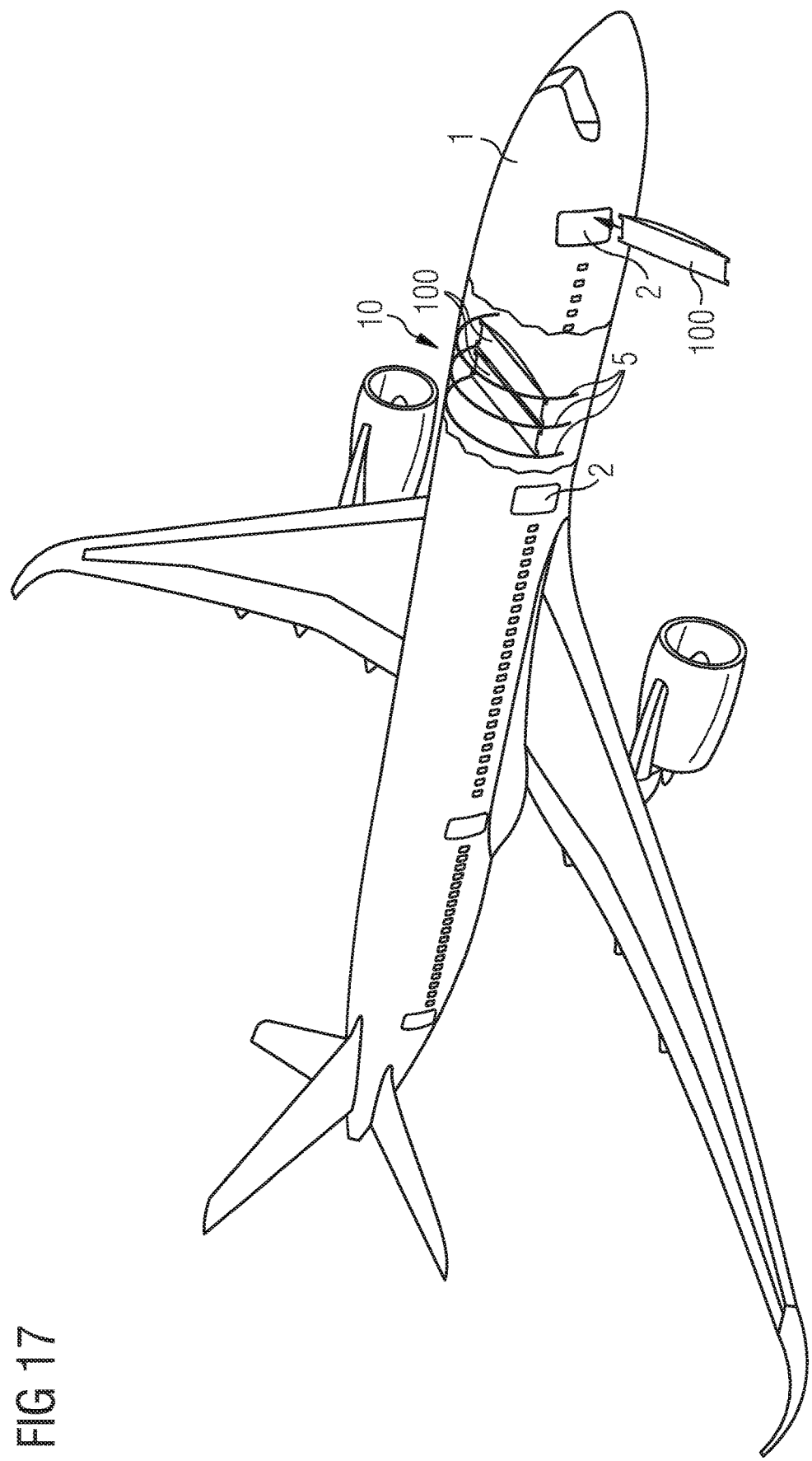
FIG. 17 shows schematically a perspective view of an aircraft with an exposed detail of an aircraft region with floor assemblies.

FIG. 17 schematically shows a perspective view of an aircraft 1 with an exposed detail of an aircraft region 10 having floor assemblies. Frames 5 can thus form the cross section of the aircraft 1. A self-supporting floor element 100 can be arranged between each two frames 5 and rests on at least one frame 5.

As a result, the use of a floor assembly for installation of a cabin floor in the aircraft 1 is possible, even after interior components 9 that are to be provided have been attached to a fuselage of the aircraft. Similarly, the use of a floor assembly for converting a cabin floor of the aircraft 1 is possible. Floor elements 100 which are especially capable of supporting a load in a region in which a monument is to be provided, or lighter floor elements 100 for the arrangement of passenger rows of seats, can be inserted or replaced even retrospectively.

The floor elements 100 can have a width which approximately corresponds to the distance between two frames 5 in the longitudinal direction of the aircraft 1. Since a hatch or door 2 of the aircraft 1 is also generally arranged between two frames 5, the floor elements 100 can be transported into the interior of the aircraft or out of same through such a hatch or door 2. Conversion of a cabin floor or hold compartment floor of an aircraft 1 which has already been completed is therefore possible even at a later time.

Finally, it should be pointed out in particular that the variants, refinements and exemplary embodiments discussed above serve merely for describing the claimed teaching, but do not restrict the latter to the variants, refinements and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A floor assembly for an aircraft, comprising:
   a multiplicity of supports configured to be fastened in pairs to opposite transverse sides of a frame of the aircraft, wherein the frame forms a cross-sectional shape of the aircraft; and
   a monolithic, self-supporting floor element comprising at least two longitudinal members, a floor plate arranged on the longitudinal members and a respective connecting element arranged at each end of each of the longitudinal members,
   wherein each of the multiplicity of supports has a horizontal support surface which is dimensioned such that the respective connection element rests on the horizontal support surface, wherein vertical loads of the self-supporting floor element are transferred to the frame of the aircraft,
   wherein the floor element is fastened to the frame of the aircraft by fastening of each connecting element arranged at each end of each of the longitudinal members to a corresponding support, and
   wherein the floor plate extends in a direction of the longitudinal members at least between two supports fastened in pairs, and the at least two longitudinal members extend transversely to a longitudinal axis of the aircraft.

2. The floor assembly according to claim 1, wherein at least one of
   the monolithic floor element is produced at least in sections from a composite material, or
   the floor plate, at at least one of its ends facing the connecting elements, has a foot angle which is a continuation of the floor plate moving away from the longitudinal members.

3. The floor assembly according to claim 1,
   wherein the monolithic floor element comprises at least one crossmember arranged perpendicularly to the longitudinal members, and
   wherein the monolithic floor element comprises at least one crossbar extending obliquely between the longitudinal members and the crossmember.

4. The floor assembly according to claim 1,
   wherein each of the longitudinal members has at least one web and a flange lying opposite the floor plate, and
   wherein a region of at least one of the longitudinal members between the web and the floor plate has a reinforcement.

5. The floor assembly according to claim 4,
   wherein the web comprises a slot running in the longitudinal direction of the at least one of the longitudinal members,
   wherein the slot is located centrally in the longitudinal direction of the at least one of the longitudinal members,
   wherein the slot has a height of between 3 and 10 mm, and
   wherein the slot has a length in the longitudinal direction of the at least one of the longitudinal members that corresponds to a width of a passenger aisle in an aircraft.

6. The floor assembly according to claim 1,
   wherein the support has at least one projection, and wherein the connecting element has an opening which is configured to receive the projection, or
   wherein the support has at least one opening, and wherein the connecting element is configured to be inserted into the opening of the support.

7. The floor assembly according to claim 1,
   wherein a projection is formed by a separate component having a stub which is configured to be fastened to the support or to the connecting element, and
   wherein the component has, on a side facing the support or the connecting element, a tooth profile which corresponds to a tooth profile on the support or the connecting element.

8. The floor assembly according to claim 1, furthermore comprising:
   a seat rail integrated in the floor plate,
   wherein at least one of the longitudinal members or the floor plate has a recess in which the seat rail runs.

9. The floor assembly according to claim 1, furthermore comprising:
   at least one coupling device arranged at least one of at or in one of the longitudinal members,
   wherein the coupling device either has a coupling bolt which extends away from the at least one of the longitudinal members perpendicularly to a longitudinal axis thereof and away from the floor plate, or a bolt receptacle which extends perpendicularly to a longitudinal axis of the at least one of the longitudinal members and into a region below the floor plate.

10. The floor assembly according to claim 9, furthermore comprising:
    a seat rail integrated in the floor plate,
    wherein at least one of the longitudinal members or the floor plate has a recess in which the seat rail runs,
    wherein the coupling device is attached to one end of the seat rail or is integrated in the seat rail.

11. The floor assembly according to claim 9, wherein the coupling device is configured to receive a connection element which is configured to be connected to an interior component.

12. The floor assembly according to claim 1, wherein the monolithic floor element comprises at least one of a line or one or more connections for supply lines.

13. An aircraft region, comprising:
    at least two frames arranged parallel to one another in a longitudinal direction of the aircraft; and
    at least one floor assembly according to claim 1.

14. The aircraft region according to claim 13, wherein a width of the floor element of the at least one floor assembly in the longitudinal direction of the aircraft corresponds to a distance between the two frames in the longitudinal distance of the aircraft.

15. An aircraft comprising the aircraft region according to claim 12.

* * * * *